May 3, 1960 — G. S. ELLIS — 2,935,343
PRESSURE RESPONSIVE FLUID TIGHT PIPE JOINT
Filed March 12, 1957
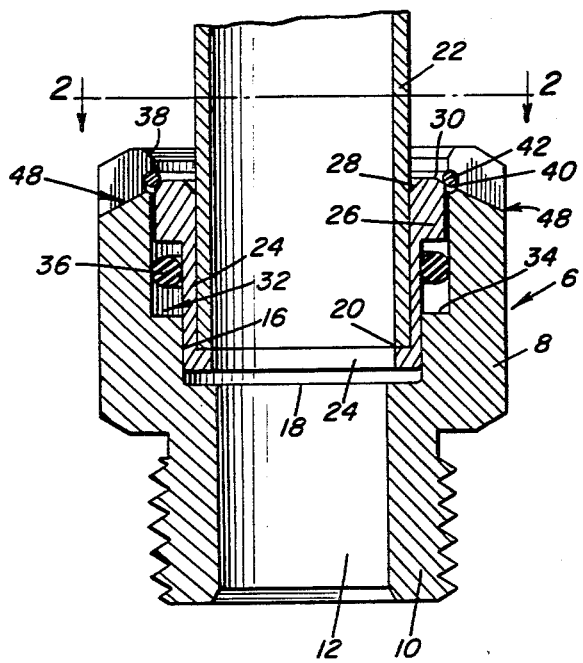
Fig. 1
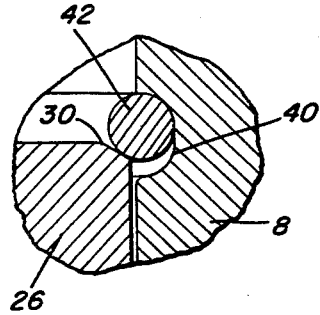
Fig. 3
Fig. 4
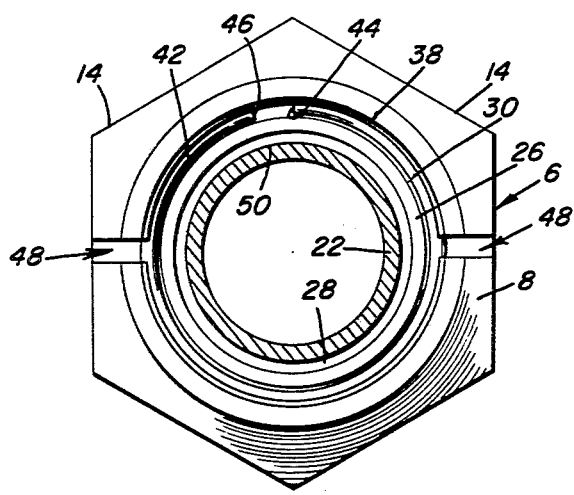
Fig. 2
Fig. 5
George S. Ellis
INVENTOR.

2,935,343

PRESSURE RESPONSIVE FLUID TIGHT PIPE JOINT

George S. Ellis, Two Rivers, Wis.

Application March 12, 1957, Serial No. 645,481

2 Claims. (Cl. 285—95)

The present invention relates to certain new and useful improvements in pipe and tube joint constructions and has reference in particular to a pressure responsive fluid tight joint wherein the cooperating component parts are fittingly designed to provide a joint which does not impose undue stresses and strain on the tube and complemental end fittings such as are induced in conventional-type threaded and flared constructions currently existing in high pressure conduits or lines.

An object of the invention is to structurally, functionally and otherwise improve upon similarly functioning swivel joints of a generally analogous character and, in so doing, to provide a structurally distinct adaptation in which manufacturers will find their manufacturing requirements and economies met and users will find their long expected needs effectually met.

Briefly summarized, the invention in a preferred embodiment thereof is characterized by an end fitting embodying a body portion having a screw-threaded neck and provided interiorly with an axial recess communicatively aligned with the bore in said neck, that portion of the recess adjacent to said bore being reduced in cross-sectional diameter and providing a shouldered tube receiving socket and that portion of the recess outwardly of the socket being of increased cross-sectional diameter and providing a chamber and also a shoulder at the juncture of the socket and chamber, the wall of said chamber having an endless ring groove, a pressurized fluid conducting tube having a permanently attached adapter a portion of which is seated in said socket and a portion telescoping into the confines of said chamber, an O-ring encircling the last named portion of the adapter and interposed between the latter and cooperating wall portion of said chamber, and a split expansible and contractible retaining ring lodged in said groove, said adapter having an end portion engaging said ring and being held in jointing position by said ring.

In reducing the concept to practice the adapter-equipped end portion of the tube is flareless and is therefore uniform in cross-sectional diameter and the adapter takes the form of a sleeve which embraces the cooperating end portion of the tube and has a turned in lateral flange at its inner end abutting and seating the coacting end of the tube. The adapter is provided at its opposite end with an outstanding collar which confines the O-ring in the space between the collar and bottom of the chamber. Additionally, the outer peripheral or marginal edge of the collar is chamfered and provides a bevel. This bevel has camming engagement with the ring and inasmuch as the depth of the groove is greater than one-half the cross-sectional diameter of the ring and when the ring is expanded as a result of the camming action, it is effectually acted upon and securely lodged and locked in the groove and maintained against displacement. Therefore, these pressure responsive cooperating parts result in effecting a fluid tight joint against fluid pressure acting in either direction upon the O-ring.

Then, too, the invention features a split metal retainer ring which not only performs adequately and satisfactorily and a combination of forces imposed by pressure and vibrations but is also novel in that the construction is such that it facilitates handling the insertion and removal requirements of the ring.

Features and advantages not expressly mentioned above will become self-evident from the following specification and subjoined claims.

In the accompanying drawings wherein like numerals are employed to designate like parts throughout the views:

Figure 1 is a central longitudinal sectional view of the complete ready-to-use pressure responsive fluid tight joint constructed in accordance with the principles of the invention;

Fig. 2 is a section on the horizontal line 2—2 of Fig. 1 looking in the direction of the arrows;

Fig. 3 is a fragmentary exaggerated view intended to stress the camming cooperation between the collar and the ring; and Figs. 4 and 5 are detailed views of the expansible and contractible split ring.

The end fitting seen in Figs. 1 and 2 is denoted generally by the numeral 6 and comprises a body portion 8 provided at one end with a reduced screw-threaded attaching neck 10 having an axial bore or passage 12. The exterior surfaces 14 of the body portion are flat faced to provide tool grips. As before mentioned the body portion is provided interiorly with an axial recess communicatively aligned with the bore 12. That portion of the recess adjacent to the bore is reduced in cross-sectional diameter as at 15 to define a shouldered socket 18. This is of a dimension to telescopingly receive the adapter-equipped end portion 20 of the pipe or tube 22. The adapter comprises a sleeve 24 which exteriorly surrounds and is welded or otherwise fixed to and becomes a part of the tube end. It will be noticed that the lower end (in Fig. 1) of the adapter has a turned in flange 24 which seats the tube. It will also be noted that the tube is uniform in cross-sectional diameter. The upper end of the sleeve is increased in cross-section to define an annular endless collar 26. The upper end of the collar has an inner peripheral bevel 28 and also, what is more important, an outer peripheral or marginal bevel 30 which functions as the aforementioned cam. The upper portion of the recess is enlarged in cross-sectional diameter to define a chamber 32 the bottom of which is denoted at 34 and it is in this chamber that the aforementioned O-ring 36 is confined and operable. The ring surrounds the sleeve portion of the adapter and is situated between the shoulder or bottom 34 and bottom side of the collar 26 all as seen in Fig. 1. The extreme upper end of the chamber is also provided with an endless bevel 38 which is parallel to and above the groove or channel 40 in the wall of the chamber. The ring 42 is seated in the aforementioned groove 40 and, as seen in Fig. 3, the depth of the groove is greater than one-half the cross-sectional diameter of the ring. This construction renders the camming cooperation between the bevel 30 and ring 42 significantly important. The ends 44 and 46 of the ring are spaced apart as shown. Removal of the ring 42 is accomplished by merely inserting a pointed tool, such as a knife blade (not shown) under the ring by way of the notches 48 provided for that purpose.

In the assembly seen the O-ring functions in a manner to provide a pressure dam against fluid pressure acting in either direction upon the ring. The adapter is such in dimension and design to limit the length of the tube disposed within it and to aptly confine the bonding agent with which the adapter is secured to the tube. The retaining ring 42 is the outstanding feature of the over-all joint. It has been found in practice that the conventional split retaining ring does not perform satisfactorily under the combination of forces imposed by pressure and vibration. That is to say, the groove in the body portion of the fitting is usually too shallow to retain the conventional type retaining ring and under these conditions the ring works out of the groove and causes failure of the joint. The combination herein revealed and involving the bevel on the collar provides a retaining device which is not adversely effected by the combination of pressure, vibration or radial stresses and relative movements. As mentioned the bevel on the collar contacts or engages the wire ring and expands it tightly into the groove providing a retainer which cannot become dislodged accidentally. The use of a ring of round wire provides an assembly which is compact as opposed to the disproportionately large and bulky body members required in conventional split ring joints.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pressure-type fluid-tight pipe joint wherein the joined components are telescopically fitted together and in which limited axial and angular relative movement of the components is permissible comprising, in combination, an end fitting embodying a body portion having an axial recess, that portion of the recess adjacent to a connectible end of said fitting being reduced in cross-sectional diameter and providing a tube receiving socket, and that portion of the recess outwardly of the socket being of increased cross-sectional diameter and providing a chamber and also a shoulder at the juncture of the socket and chamber, an outer end portion of the wall of said chamber having at least one notch having an outwardly and downwardly inclined bottom and opening at an outwardly disposed end through the outer end of the fitting, the interior of the wall of said chamber spaced slightly inwardly of the open mouth of the chamber having an endless groove for reception of an insertable and removable retaining ring, a fluid conducting tube having an end portion surrounded exteriorly by an adapter sleeve permanently attached to said end portion, said sleeve telescoping into said socket, said sleeve being increased in cross-section at one end and providing an endless collar, the outer peripheral surface of the collar having slidable but operating contact with the coacting wall of the chamber, an O-ring encircling the adapter sleeve and interposed between and contacting the sleeve and bottom and interior walls of the chamber, and a spring-wire split retaining ring of an outside diameter greater than the corresponding diameter of the retaining groove, said ring being removably lodged in said groove, said groove being of a depth slightly greater than one-half the cross-sectional diameter of said ring, said ring being constantly located in the groove when in use and interposed between the bottom of the groove and an outer peripheral edge of said collar, said outer peripheral edge being beveled and cooperable with a rounded peripheral surface of the retaining ring and constituting a cam whereby any movement of the tube that would tend to extract it axially from the socket and chamber results instead in camming the retaining ring into the portion of the groove in which it is seated and insures positive retaining action of the tube in said fitting, said groove having its open side facing into and communicating with said chamber, said groove being generally semi-circular in cross-section, said ring being circular in cross-section, the outer peripheral edge of said ring being in constant spring-biased engagement with the bottom of the groove and being so held by the inherent resilient and retentive properties of the ring itself and further forcibly pressed into said position by the aforementioned camming action, said groove having upper and lower walls, the upper wall overhanging the cooperating top segmental portion of the ring, the lower wall being spaced below the lower side of the ring by reason of the fact that the groove is of a greater width than the cross-section of the ring and provides a clearance space, the bottom of said notch being on a predetermined slant and providing an inclined implement guiding and supporting declivity, said declivity being in a plane at the higher end portion thereof which registers and communicates with the space in the groove below said ring.

2. A pressure-type fluid-tight pipe joint wherein the joined components are telescopically fitted together and in which limited axial and angular relative movement of the components is permissible comprising, in combination, an end fitting embodying a body portion having an axial recess, that portion of the recess adjacent to a connectible end of said fitting being reduced in cross-sectional diameter and providing a tube receiving socket, and that portion of the recess outwardly of the socket being of increased cross-sectional diameter and providing a chamber and also a shoulder at the juncture of the socket and chamber, an outer end portion of the wall of said chamber having at least one notch having an outwardly and downwardly inclined bottom and opening at an outwardly disposed end through the outer end of the fitting, the interior of the wall of said chamber spaced slightly inwardly of the open mouth of the chamber having an endless groove for reception of an insertable and removable retaining ring, a fluid conducting tube having an end portion surrounded exteriorly by an adapter sleeve permanently attached to said end portion, said sleeve telescoping into said socket, said sleeve being increased in cross-section at one end and providing an endless collar, the outer peripheral surface of the collar having slidable but operating contact with the coacting wall of the chamber, an O-ring encircling the adapter sleeve and interposed between and contacting the sleeve and bottom and interior walls of the chamber, and a spring-wire split retaining ring of an outside diameter greater than the corresponding diameter of the retaining groove, said ring being removably lodged in said groove, said groove being of a depth slightly greater than one-half the cross-sectional diameter of said ring, said ring being constantly located in the groove when in use and interposed between the bottom of the groove and an outer peripheral edge of said collar, said outer peripheral edge being beveled and cooperable with a rounded peripheral surface of the retaining ring and constituting a cam whereby any movement of the tube that would tend to extract it axially from the socket and chamber results instead in camming the retaining ring into the portion of the groove in which it is seated and insures positive retaining action of the tube in said fitting, said groove having its open side facing into and communicating with said chamber, said groove being generally semi-circular in cross-section, said ring being circular in cross-section, the outer peripheral edge of said ring being in constant spring-biased engagement with the bottom of the groove and being so held by the inherent resilient and retentive properties of the ring itself and further forcibly pressed into said position by the aforementioned camming action, said groove having upper and lower walls, the upper wall overhanging the cooperating top segmental portion of the ring, the lower wall of said groove being spaced below the bottom of the ring due to the fact that the groove is of a greater width than the cross-section of the ring and providing a clearance space, the bottom of said notch being on a predetermined inclination and providing an implement guiding and supporting declivity, said surface being in a plane at the higher end portion thereof which registers and communicates with the space in the groove below the bottom of the ring; and the inclination of the bevel on the edge of said collar being of a degree matching the degree of inclination of the declivity so that when a probing and dislodging implement, such as the blade of a conventional pocket knife, is inserted into said notch it rides up the declivity into the clearance space in the groove beneath the ring and, if necessary, to make a complete dislodgement of the ring, also rides across said bevel.

References Cited in the file of this patent

UNITED STATES PATENTS

| | | | |
|---|---|---|---|
| 2,253,018 | Cowles | Aug. 19, | 1941 |
| 2,290,776 | Stillwagon | July 21, | 1942 |
| 2,427,260 | Cowles | Sept. 9, | 1947 |
| 2,441,344 | Bosworth | May 11, | 1948 |
| 2,453,597 | Sarver | Nov. 9, | 1948 |
| 2,495,615 | Vander Clute | Jan. 24, | 1950 |
| 2,525,667 | Goolsbee et al. | Oct. 10, | 1950 |
| 2,727,761 | Elliot | Dec. 20, | 1955 |
| 2,749,151 | Lyons | June 5, | 1956 |
| 2,781,942 | Eastburg | Feb. 19, | 1957 |
| 2,805,089 | Hansen | Sept. 3, | 1957 |
| 2,848,255 | Klein | Aug. 19, | 1958 |

FOREIGN PATENTS

| | | | |
|---|---|---|---|
| 1,030,266 | France | Mar. 11, | 1953 |
| 82,216 | Netherlands | July 16, | 1956 |